United States Patent
Tschirk

(10) Patent No.: US 8,553,823 B2
(45) Date of Patent: Oct. 8, 2013

(54) METHOD FOR IDENTIFYING SIGNALS OF THE SAME ORIGIN

(75) Inventor: Wolfgang Tschirk, Vienna (AT)

(73) Assignee: Siemens Convergence Creators GmbH, Vienna (AT)

( * ) Notice: Subject to any disclaimer, the term of this patent is extended or adjusted under 35 U.S.C. 154(b) by 847 days.

(21) Appl. No.: 12/524,218

(22) PCT Filed: Nov. 27, 2007
(Under 37 CFR 1.47)

(86) PCT No.: PCT/EP2007/062845
§ 371 (c)(1),
(2), (4) Date: Apr. 14, 2010

(87) PCT Pub. No.: WO2008/089861
PCT Pub. Date: Jul. 31, 2008

(65) Prior Publication Data
US 2011/0090943 A1 Apr. 21, 2011

(30) Foreign Application Priority Data

Jan. 23, 2007 (EP) .................... 07100973

(51) Int. Cl.
*H04B 17/00* (2006.01)
*G10L 15/00* (2013.01)
*G06K 9/52* (2006.01)

(52) U.S. Cl.
USPC ............... 375/350; 379/406.08; 379/406.07

(58) Field of Classification Search
USPC ............ 375/350, 232, 230; 379/406.01, 379/406.07, 406.08, 406.16, 416, 417; 370/286, 370/288, 290; 455/570
See application file for complete search history.

(56) References Cited

U.S. PATENT DOCUMENTS

| | | | | |
|---|---|---|---|---|
| 5,539,731 A * | 7/1996 | Haneda et al. | ................ | 370/286 |
| 5,546,459 A * | 8/1996 | Sih et al. | .................. | 379/406.09 |
| 6,185,299 B1 * | 2/2001 | Goldin | ..................... | 379/406.08 |
| 6,959,167 B1 * | 10/2005 | Dehandschutter | ................ | 455/1 |
| 2003/0123674 A1 * | 7/2003 | Boland | .......................... | 381/66 |
| 2003/0133565 A1 * | 7/2003 | Chang et al. | ............. | 379/406.01 |
| 2003/0223382 A1 * | 12/2003 | Popovic et al. | .............. | 370/286 |
| 2004/0037417 A1 * | 2/2004 | Seibert | ..................... | 379/406.01 |
| 2005/0041764 A1 * | 2/2005 | Yamamoto et al. | .......... | 375/350 |
| 2009/0022074 A1 * | 1/2009 | Brox | .............................. | 370/286 |
| 2009/0304178 A1 * | 12/2009 | Takada | ..................... | 379/406.08 |
| 2011/0058667 A1 * | 3/2011 | Takada | ..................... | 379/406.08 |

FOREIGN PATENT DOCUMENTS

DE  10 2006 060 002 A1  6/2008
WO  WO 01/65543 A1  9/2001

OTHER PUBLICATIONS

Petrus Christianus Wilhelmus Sommen,"Adaptive Filtering Methods",Technische Universiteit Eindhoven, Jun. 1992.*
Stearns, S.D., "Digital processing of analog signals", Oldenbourg, Muenchen&Wien 1984, Chapter 13.5.
Widrow, B. and Stearns, S. D., "Adaptive Signal Processing", Prentice Hall, Englewood Cliffs, NJ, 1985.

* cited by examiner

*Primary Examiner* — Aristocratis Fotakis

(57) ABSTRACT

A method for identifying signals of the same origin is described. The signals are identified based upon a method of system analysis, wherein an accumulated value of an attenuation weighted by power of an incoming channel, the so-called correspondence coefficient, is used as the criterion whether two signals are of the same origin.

15 Claims, 2 Drawing Sheets

METHOD FOR IDENTIFYING SIGNALS OF THE SAME ORIGIN

CROSS REFERENCE TO RELATED APPLICATIONS

This application is the US National Stage of International Application No. PCT/EP2007/062845 filed Nov. 27, 2007, and claims the benefit thereof. The International Application claims the benefits of European Patent Application No. 07100973.2 EP filed Jan. 23, 2007; both of the applications are incorporated by reference herein in their entirety.

FIELD OF INVENTION

The invention relates to a method and a device for identifying signals of the same origin.

BACKGROUND OF INVENTION

Voice channels that carry digitized voice information can have distinctly different bit sequences even if they are of the same origin. Definite, reliable and rapid identification of such related (corresponding) voice channels is difficult particularly in communications networks, because the individual network elements of a communications network compress, encode and transmit the voice data with a delay that is sometimes large and variable.

Locating those signals that come from the same origin is suited to applications in telecommunications networks in which internal interfaces are routed over transmission channels whose bandwidth requirements needs to be reduced. Such a use is described, for example, in the German application filed under reference "10 2006 060 002.9" dated Dec. 19, 2006, and not previously published. These applications make it possible to operate communications networks more efficiently, because communications paths may be shortened if applicable, and at the same time the bandwidth requirement needed for signal transmission on certain sections of communications networks can be reduced.

Various mathematical techniques are available for solving this problem of identifying signals of the same origin. Suitable methods include both "correlation analysis" (described in chapter 13.5, Stearns, S. D.; "Digital processing of analog signals"; Oldenbourg, München & Wien 1984) and "system analysis" (described in chapter 9, "Adaptive Signal Processing"; Widrow, B.; Stearns, S. D.; Prentice-Hall, Englewood Cliffs, N.J., 1985). Both methods have in common the fact that they supply unreliable conclusions in situations in which two non-corresponding channels are similar, or the signal levels of the channels are low. For both "correlation analysis" and "system analysis", large amounts of computing power and long analysis times are needed to rectify this shortcoming in order to use either of these techniques in practice.

SUMMARY OF INVENTION

An object of the invention is to define a method for identifying signals of the same origin that avoids the disadvantages of the methods known from the prior art.

The object is achieved by a method of system analysis and a device for implementing this method, in which
a first signal (X) is supplied to the input of a digital filter W,
a difference signal (D) is formed from the filter output signal (WX) of this digital filter (W) and a second signal (Y),
this difference signal (D) is used to adapt the transfer function of the digital filter (W) so as to minimize the difference signal (D),
an attenuation value (R) is calculated from the power values of the difference signal (D) and the second signal (Y) using the equation $$R = 10\log_{10}\frac{P(Y)}{P(D)}$$

a correspondence coefficient (C(T)) is calculated from this attenuation value (R) and the power value of the second signal (Y) using the equation $$C(T) = \frac{\sum_{t=1}^{T} P^{\alpha}(Y)_t R_t}{\sum_{t=1}^{T} P^{\alpha}(Y)_t}$$

and used as a measure for identifying a common origin of the two signals (X, Y).

This method can be used to achieve the advantage that signals of the same origin are identified quickly and reliably, and the probability of incorrectly identifying two signals as related, is extremely low.

An essential aspect of the invention is that the method of system analysis is used, with the attenuation being weighted by the power of the incoming channel, and the summated value of this power-weighted attenuation, which is referred to as the correspondence coefficient, being used as the criterion as to whether two signals are of the same origin.

The method also provides the advantage that solely those signals carried in the channels are used for identification; any modification, e.g. insertion of identification signals, is not necessary.

An advantageous embodiment of the invention provides that, prior to processing, the signals that are carried on the channels undergoing identification are limited in bandwidth by a low-pass filter, and that the sampling rate of the signal is reduced (downsampled). This results in a distinct reduction in the computing power required to implement the method. Typically, the bandwidth is reduced by low-pass filtering with a cutoff frequency of 500 Hz, and the sampling rate is reduced by a factor of eight.

A further advantageous embodiment of the invention provides that the method is applied to processing video signals.

The method is not restricted to processing specific signals, for example audio or video signals, but is also suited to analyzing general signals. At all events, the computing power required to implement the method must be adjusted.

In the case that the method is used in an application in a mobile communications network, such as described, for example, in the German application filed under reference "10 2006 060 002.9" dated Dec. 19, 2006, and not previously published, it is particularly advantageous to evaluate the signaling data occurring when a call is set up, and to analyze selectively only those voice channels that belong to calls that have just been set up. This means that a continuous, cyclical analysis of all voice channels can stop, and hence the computing power required to implement the method can be reduced.

BRIEF DESCRIPTION OF THE DRAWINGS

In the drawings, by way of example.

DETAILED DESCRIPTION OF INVENTION

Figure 1:
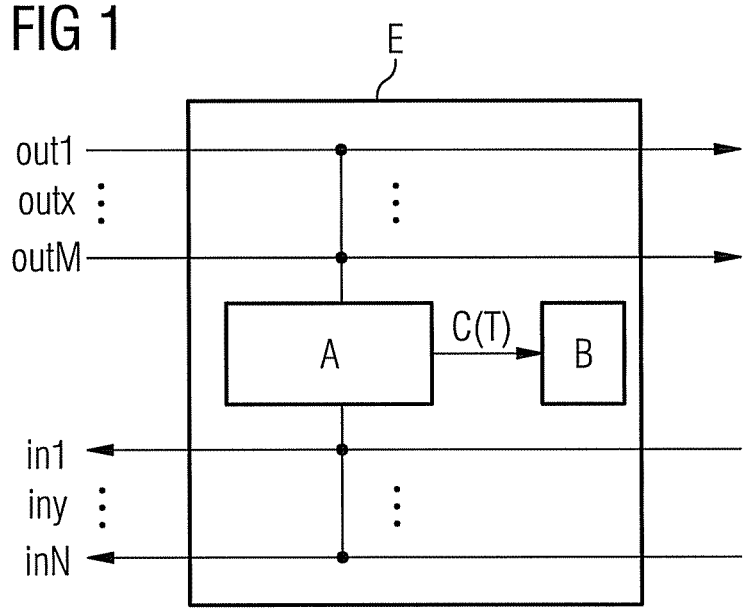
FIG. 1 shows a block diagram of a device for identifying voice channels of the same origin

FIG. 1 shows schematically an identification device E for implementing the method according to the invention. This identification device E performs the task of identifying whether one of the outgoing signals out1 ... outx ... outM has the same origin as one of the incoming signals in1 . . . iny . . . inN. For this purpose, this identification device E contains a system identifier A, which, under the control of the identification device E, can examine every possible combination of out1 ... outx ... outM and in1 ... iny ... inN signals, and which calculates a correspondence coefficient C(T), which a higher-level assessment unit B can use to identify whether the respective signal pair composed of outgoing out1 ... outx ... outM signals and incoming in1 ... iny ... in N signals has the same origin.

A system identifier basically works by adjusting a digital filter W so that the difference between a low-pass filtered incoming signal Y and a filter output signal WX converges to zero over time.

Figure 2:
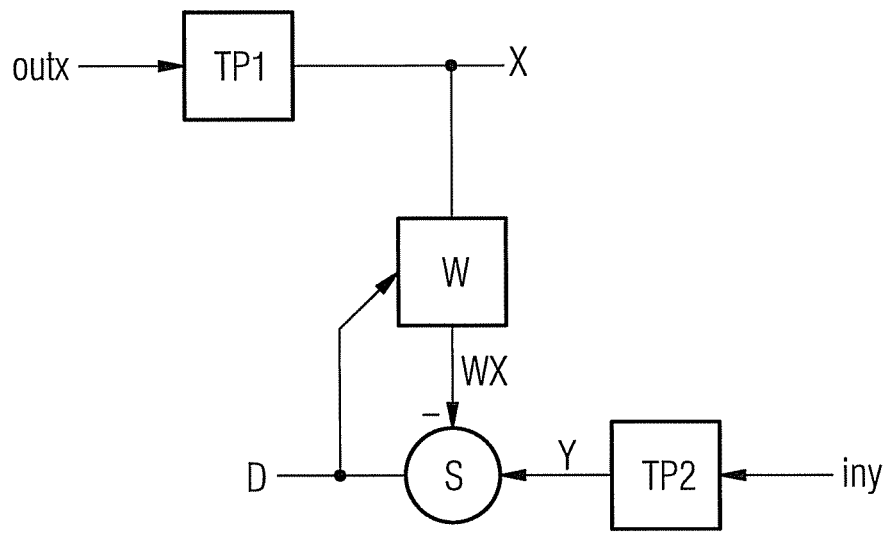
FIG. 2 shows a schematic diagram of a system identifier

FIG. 2 shows schematically a system identifier, such as contained in FIG. 1. Here, the outgoing signal outx constitutes the signal carried on the outgoing channel currently undergoing analysis, and the incoming signal my constitutes the signal carried on the incoming channel currently undergoing analysis.

This example shows an application in telecommunications. The incoming signal iny and the outgoing signal outx are composed of linearly coded samples of analog voice signals. In telephony applications, voice signals are typically sampled at a frequency of 8 kHz.

The outgoing signal outx currently being analyzed is limited in its bandwidth by a low-pass filter TP1, and this band-limited signal X serves as the input signal to the digital filter W. The incoming signal iny currently being analyzed is limited in its bandwidth by the low-pass filter TP2, and this band-limited signal Y serves as the input signal to the summation point S.

The digital filter W has the task of replicating the transfer function that is applied in the network elements downstream of the identification device E to the outgoing signal outx currently being analyzed. The digital filter W applies its transfer function, which is variable, to the signal X, and forms the filter output signal WX. The digital filter W receives the difference signal D from the difference, formed in the summation point S, between the filter output signal WX and the low-pass filtered incoming signal Y, in order to adapt its filter coefficients so as to minimize the difference signal D.

If the process succeeds in adjusting the digital filter W so that the difference signal D converges towards zero over time, then the analyzed pair of the outgoing signal outx and the incoming signal iny is deemed to be identified as of the same origin (corresponding).

Methods that adjust the coefficients of a digital filter so that the difference signal D converges towards zero over time, are described, for example, in chapter 6, "Adaptive Signal Processing"; Widrow, B.; Stearns, S. D.; Prentice-Hall, Englewood Cliffs, N.J., 1985.

In the ideal case, in which the digital filter W manages to replicate fully the transfer function that is applied in the network elements downstream of the identification device E to the outgoing signal outx, the difference signal D converges towards zero over time. Hence the logarithm of the ratio of the powers of the signals Y and D is used as the criterion for identifying whether the outgoing signal outx currently being analyzed and the incoming signal iny currently being analyzed are of the same origin. This logarithm of the ratio constitutes the attenuation R and is calculated using the equation:

$$R = 10\log_{10}\frac{P(Y)}{P(D)} \qquad \text{Equation 1}$$

The variables P(D) and P(Y) represent the sum of the squares of the amplitudes over a time period that depends on the type of signal under analysis. In real applications in telephony, time periods of 50 ms to 380 ms are used, for example.

In this ideal case, the attenuation R converges towards infinity.

Hence according to the invention, the summated value of the attenuation weighted by the power of the low-pass filtered incoming signal my is used as a measure for the degree of correspondence.

This value C(T) constitutes a correspondence coefficient at time T, and is calculated from the equation:

$$C(T) = \frac{\sum_{t=1}^{T} P^{\alpha}(Y)_t R_t}{\sum_{t=1}^{T} P^{\alpha}(Y)_t} \qquad \text{Equation 2}$$

The index t represents the point in time of the iteration, measured in sampling intervals, starting with the start of the analysis.

The alpha exponent presented in Equation 2 ranges between the values 1 and 3 depending on the signal under analysis.

Figure 3:
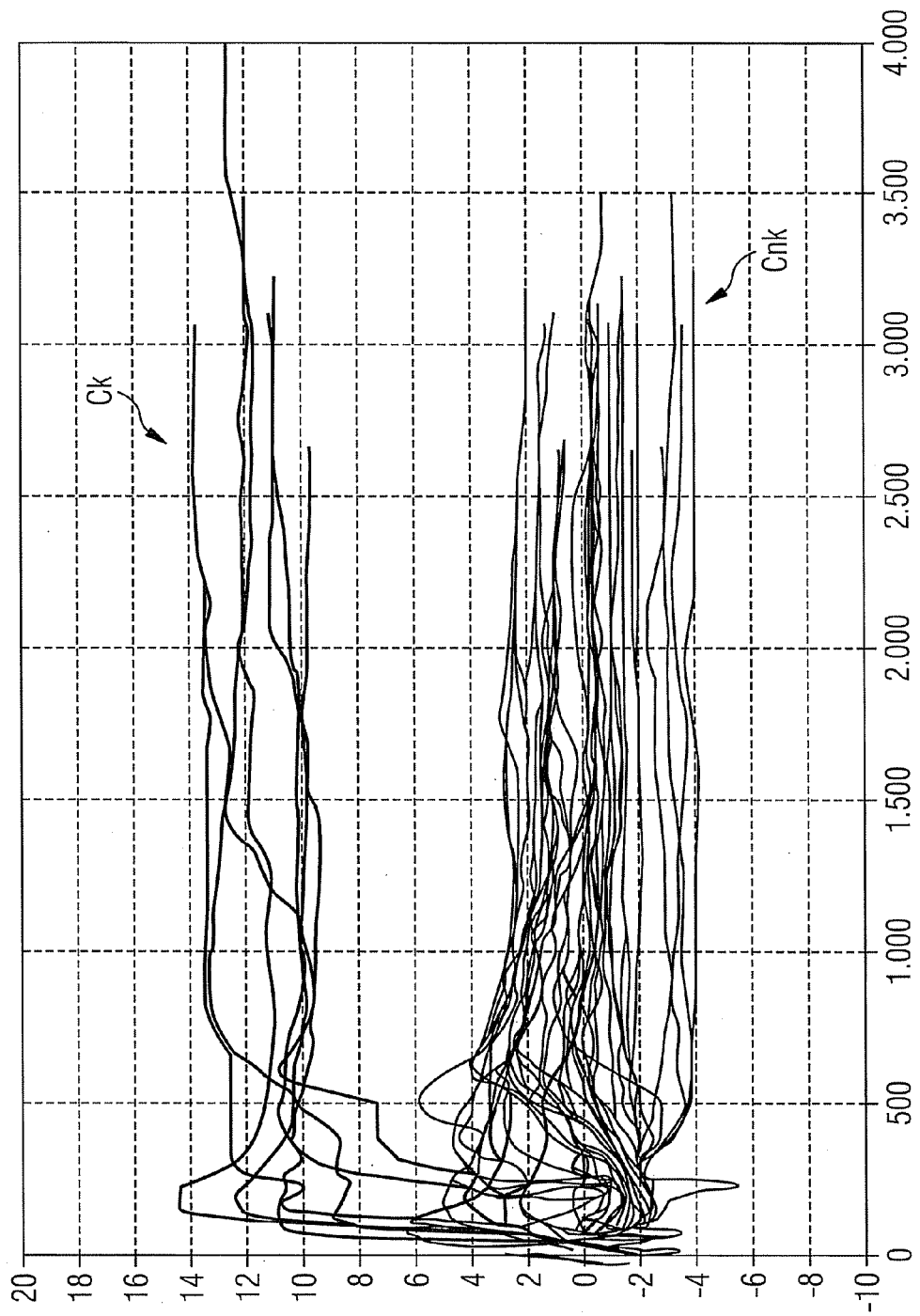
FIG. 3 shows a graph containing measured values of the correspondence coefficient C(T)

FIG. 3 shows the curve of a correspondence coefficient C(T) in a practical implementation of the method according to the invention. The horizontal axis is the time axis, with the axis being labeled in this case with units of milliseconds. The vertical axis shows the variation in the correspondence coefficient C(T) in decibels. The set of curves Ck represents measured values of the correspondence coefficient C(T) in the case that the channels undergoing analysis are carrying signals from the same source, i.e. are corresponding channels. The set of curves Cnk represents measured values of the correspondence coefficient C(T) in the case that the channels undergoing analysis are carrying signals from different sources.

The described method follows the procedure below:

a) Selecting a pair of signals to be analyzed, each pair composed of an outgoing signal out1 ... outx ... outM and an incoming signal in1 . . . iny . . . inN, and supplying these signals to the system identifier A. It is advantageous here to exclude previously analyzed signal pairs. In telecommunications applications, the signals out1 ... outx ... outM and in1 ... iny ... inN represent the voice signals transmitted in voice channels, with it being particularly advantageous here to examine signals being carried on voice channels that have just been set up, because in this case there is a considerably higher probability of finding signals of the same origin, and the computing power available for implementing the methods is hence used more efficiently.

b) Implementing the system analysis in accordance with the method according to the invention, and calculating the correspondence coefficient C(T) using Equation 2.

c) Analyzing the correspondence coefficient C(T), and making a decision as to whether the signals currently being considered are of the same origin. The described method ensures that the correspondence coefficient C(T) enables a definite decision. The actual time threshold values, at and after which it is possible to draw a conclusion about the correspondence of two examined signals, depends on the signals under examination, and in particular on the time delay with which an incoming signal in1 . . . iny . . . inN arrives.

FIG. 3 shows an example of the analysis of voice signals that are subject to the distortions and delays typical in telecommunications networks. It is found in this case that the method according to the invention enables a reliable decision as to the correspondence of two signals to be made after an analysis time of only about 1.5 seconds.

The invention claimed is:

1. A method of identifying signals of a same origin, based on a method of system analysis, comprising:
   supplying a first signal to an input of a digital filter resulting in an filter output signal;
   providing a second signal;
   forming a difference signal based upon the filter output signal of the digital filter and the second signal;
   adapting a transfer function of the digital filter by using the difference signal such that the difference signal is minimized;
   calculating an attenuation value from power values of the difference signal and the second signal using the equation $$R = 10\log_{10}\frac{P(Y)}{P(D)},$$

wherein R is the attenuation value, P(Y) is a sum of squares of amplitudes over a certain time period relating to the second signal and P(D) is a sum of squares of amplitudes over a certain time period relating to the difference signal;
   calculating a correspondence coefficient from the attenuation value and the power value of the second signal using the equation $$C(T) = \frac{\sum_{t=1}^{T} P^{\alpha}(Y)_t R_t}{\sum_{t=1}^{T} P^{\alpha}(Y)_t},$$

wherein C(T) is the correspondence coefficient being used as a measure for identifying a common origin of the first and second signals, wherein t represents a point in time of iteration, measured in sampling intervals, starting with a start of the system analysis, and wherein α (alpha) represents a value to be chosen within the range from 1 to 3.

2. The method as claimed in claim 1, wherein the first and second signals are obtained from input signals by low-pass filtering.

3. The method as claimed in claim 1, wherein the first and second signals are obtained from input signals by reducing a sampling rate.

4. The method as claimed in claim 2, wherein the first and second signals are obtained from said input signals by reducing a sampling rate.

5. The method as claimed in claim 1, wherein voice channels routed via an interface between a base station and a controller unit of a mobile communications network are used as said first and second signals.

6. The method as claimed in claim 1, wherein video channels routed via the interface between a base station and a controller unit of a mobile communications network are used as said first and second signals.

7. The method as claimed in claim 1, wherein the method is used in a telecommunications network and signaling data of the telecommunications network being used immediately after voice channels are set up to perform a process of said identifying signals of the same origin based upon the voice channels.

8. A device for identifying signals of the same origin, based on the method of system analysis, comprising: an identification unit for said identifying whether the first signal has the same origin as the second signal; a system identifier included in the identification unit and being controlled by the identification unit; the digital filter being included in the system identifier; a higher-level assessment unit included in the identification unit, wherein the device is configured to perform the method of identifying signals of the same origin as claimed in claim 1.

9. The device as claimed in claim 8, wherein the device has a selection unit for selecting the first and second signal, the first and second signals being input signals.

10. The device as claimed in claim 8, wherein the digital filter filters the first signal.

11. The device as claimed in claim 9, wherein the digital filter filters the first input signal.

12. The device as claimed in claim 8, wherein the system identifier subtracts the filter output signal of the digital filter from the second signal.

13. The device as claimed in claim 9, wherein the system identifier subtracts the filter output signal of the digital filter from the second input signal.

14. The device as claimed in claim 8, wherein the system identifier calculates the attenuation value and the correspondence coefficient.

15. The device as claimed in claim 9, wherein the system identifier calculates the attenuation value and the correspondence coefficient.

* * * * *